United States Patent
Yoshida et al.

(10) Patent No.: US 8,135,266 B2
(45) Date of Patent: Mar. 13, 2012

(54) MOBILE DEVICE

(75) Inventors: Hideo Yoshida, Saitama (JP); Shizuo Sekino, Saitama (JP); Katsuji Ozawa, Saitama (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 13/095,587

(22) Filed: Apr. 27, 2011

(65) Prior Publication Data

US 2011/0200312 A1 Aug. 18, 2011

Related U.S. Application Data

(62) Division of application No. 12/182,872, filed on Jul. 30, 2008, now Pat. No. 7,957,632.

(30) Foreign Application Priority Data

Sep. 12, 2007 (JP) ................................ P2007-236651

(51) Int. Cl.
*G03B 17/00* (2006.01)
(52) U.S. Cl. .......................................... 396/55; 396/439
(58) Field of Classification Search .................... 396/50, 396/52, 55, 439; 348/208.11
See application file for complete search history.

(56) References Cited

U.S. PATENT DOCUMENTS

2003/0044001 A1 3/2003 Kim
(Continued)

FOREIGN PATENT DOCUMENTS

CN 1580928 A 2/2005
(Continued)

OTHER PUBLICATIONS

State Intellectual Property Office Action of People's Republic of China, Sep. 18, 2009.

*Primary Examiner* — Clayton E Laballe
*Assistant Examiner* — Warren Fenwick
(74) *Attorney, Agent, or Firm* — Birch, Stewart, Kolasch & Birch, LLP

(57) ABSTRACT

A mobile device includes a camera module and a magnetism generating part that is different from the camera module. The camera module includes: a movable portion that corrects camera shake; a magnetism detecting element that detects a position of the movable portion. when the camera module is in a photographing state, the magnetism generating part is arranged at a position distant from the magnetism detecting element by at least the distance of D mm or more, where $$D = \sqrt{\text{magnetic force of the magnetism generating part [gauss]}}.$$

6 Claims, 9 Drawing Sheets

U.S. PATENT DOCUMENTS

| | | | |
|---|---|---|---|
| 2004/0157652 A1* | 8/2004 | Yamazaki | 455/575.3 |
| 2005/0031326 A1 | 2/2005 | Yamazaki | |
| 2005/0063697 A1* | 3/2005 | Tsai et al. | 396/429 |
| 2005/0225646 A1 | 10/2005 | Shintani | |
| 2006/0033818 A1* | 2/2006 | Wada et al. | 348/208.11 |
| 2007/0154194 A1* | 7/2007 | Yoon et al. | 396/50 |
| 2008/0074504 A1 | 3/2008 | Sekino | |
| 2008/0085108 A1 | 4/2008 | Sekino et al. | |
| 2009/0132198 A1* | 5/2009 | Ito et al. | 702/150 |

FOREIGN PATENT DOCUMENTS

| | | |
|---|---|---|
| CN | 1281040 C | 10/2006 |
| JP | 7-274056 A | 10/1995 |
| JP | 2612371 B2 | 2/1997 |
| JP | 2005-326807 A | 11/2005 |
| JP | 2008-089876 A | 4/2008 |
| JP | 2008-092201 A | 4/2008 |
| JP | 2008-107784 A | 5/2008 |

* cited by examiner

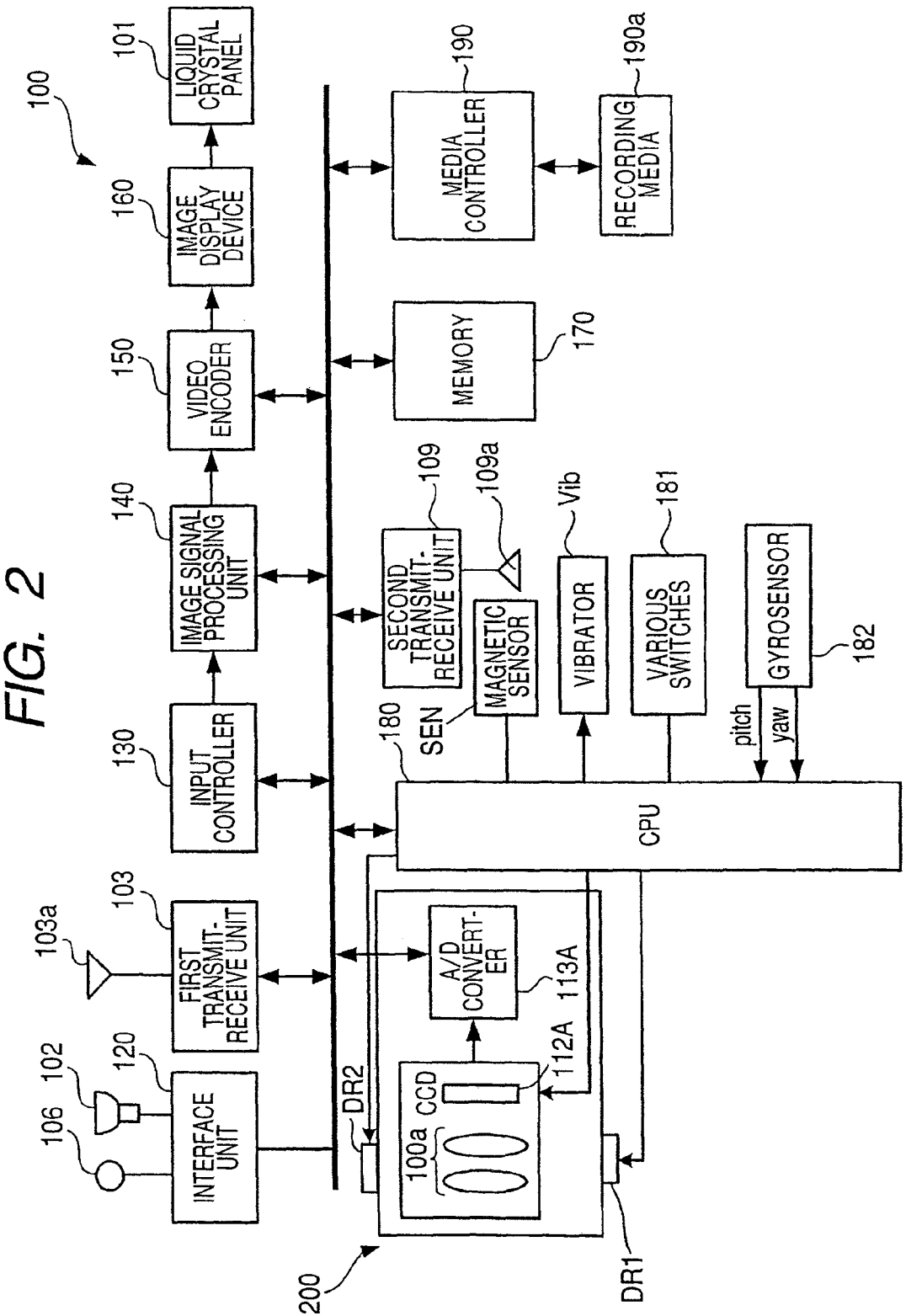

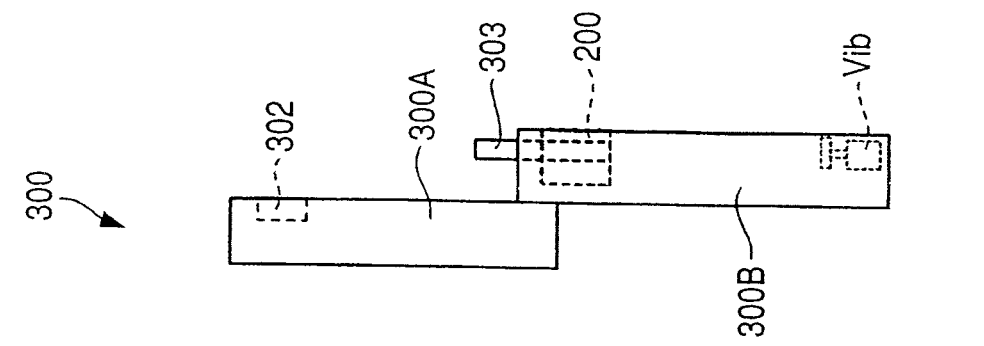
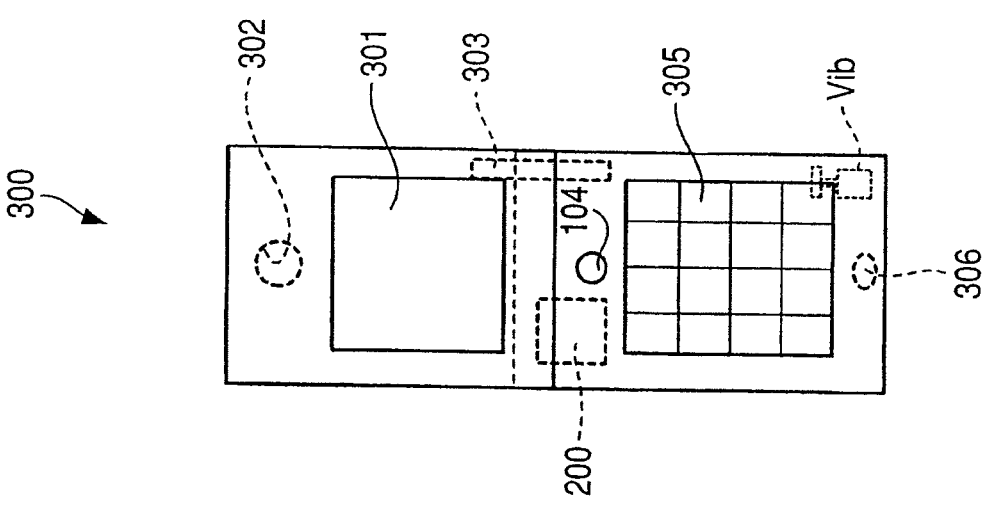
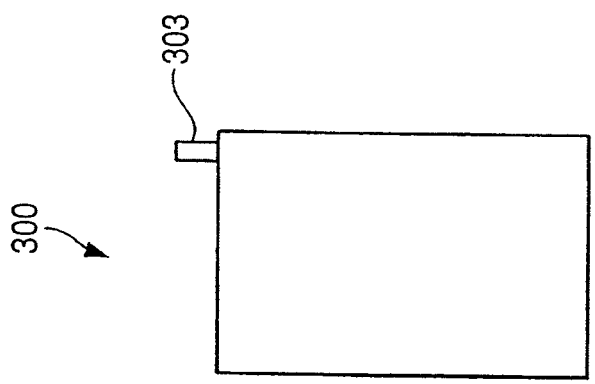

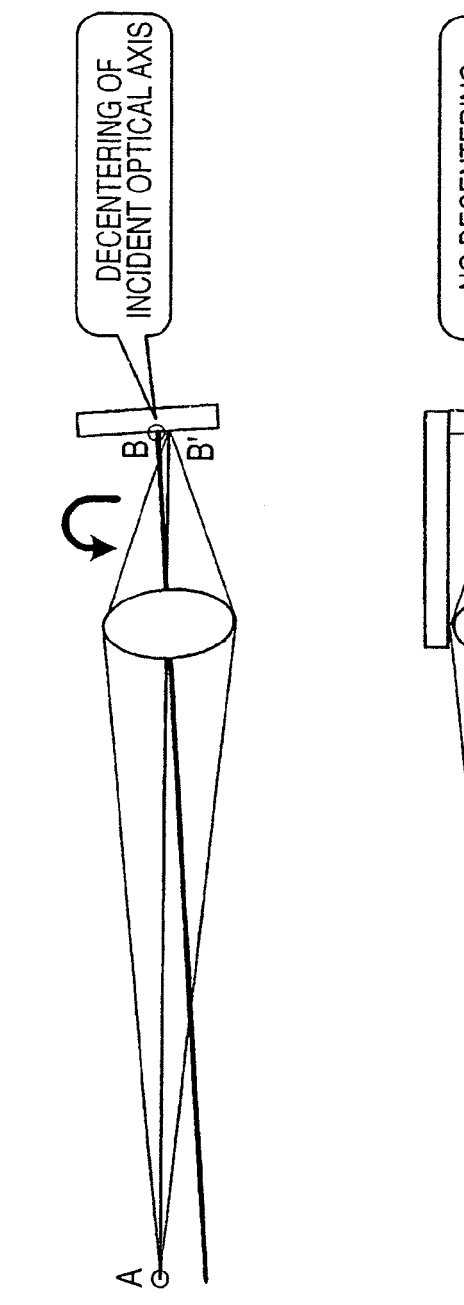
FIG. 10A NO CAMERA SHAKE
FIG. 10B CAMERA SHAKE OCCURRING
FIG. 10C ROTATION OF UNIT

MOBILE DEVICE

CROSS-REFERENCE TO RELATED APPLICATIONS

This application is a Divisional of application Ser. No. 12/182,872, filed on Jul. 30, 2008 now U.S. Pat. No. 7,957,632, which claims priority under 35 USC 119 from Japanese Patent Application No. 2007-236651 filed Sep. 12, 2007; the entire contents of which are incorporated herein by reference.

BACKGROUND

1. Technical Field

The present invention relates to a mobile device having a camera module and magnetism generating parts different from the camera module.

2. Related Art

Digital cameras employ various types of camera-shake correcting mechanisms for suppressing blur generated on photographed images by jigging of a user's hand. Concerning this matter, refer to Patent Documents 1 (JP Hei. 7-274056A), 2 (JP 2005-326807 A corresponding to US 2005/0225646 A) and 3 (JP 2612371 B).

In the camera-shake correcting mechanisms described above, some of them adopt a so-called gimbal mechanism in which a holding module which holds a picture-taking lens can be freely rotated in the pitching and the yawing direction.

However, in the gimbal mechanism disclosed in Patent Document 1 described above, it is necessary to arrange four rotary joints, which can be freely rotated, at upper, lower, right and left positions. Therefore, a size of the camera-shake correcting mechanism tends to be increased. When the size of the camera-shake correcting mechanism is forcibly reduced, problems are caused in which bearing portions of the rotary joints become fragile.

Therefore, US 2008/0085108 A, JP 2008-089876 A (corresponding to US 2008/0074504 A), JP 2008-107784 A and JP 2008-092201 A propose a drive structure that supports a pivot point which is one point on an outer circumference of a holding module so as to freely swing. And the drive structure drives the holding module through a first and second drive points which are respectively distant from the pivot point in first and second direction. Further, the Japanese Patent Application No. 2007-035341 (corresponding to U.S. patent application Ser. No. 11/972,525) proposed a technique as an image stabilization unit that enhances the position detecting accuracy of the holding module when the holding module is swinging. When the drive structures proposed in these applications are realized, it becomes possible to manufacture a small camera module even when it has an image stabilization function. Therefore, the camera module can be mounted on a small mobile device.

Operation of the camera module will be briefly explained as follows.

FIG. 10A, 10B, 10C are schematic illustrations for explaining operation of the camera module described above.

FIGS. 10A and 10B show a problem caused in the positional relation between a lens and a sensor when camera shake is generated in the middle of taking a photograph in a usual photographing device. FIG. 10C shows how the camera shake is corrected by the camera module having an image stabilization function.

As shown in FIG. 10A, in the case where no camera shake is generated, even when the camera module is not mounted on the device, an optical axis of the lens and that of the light receiving surface (the sensor surface) of the sensor agree with each other. Therefore, a photographic image is formed at a right position by light from an object. On the other hand, as shown in FIG. 10B, in the case where no image stabilization function is provided, when camera shake is generated, the lens and the sensor face are rotated in the arrow direction. Therefore, the optical axis of the lens and that of the sensor face are shifted from each other and it becomes impossible for the light from the object to form an image at the right position.

Therefore, operation is executed as follows. In the case where camera shake is generated at the time of photographing by a camera module having the image stabilization function which is mounted on a mobile device, as shown in FIG. 10C, the camera module is operated being gyrated, so that the light from an object can always form an image at a right position when the camera module is rotated in an opposite direction even if the mobile device is rotated. When the camera module having the image stabilization function is mounted on the mobile device as described above, even if the mobile device is rotated at the time of photographing, the camera module can be maintained in the same posture as that right before photographing. Therefore, it is possible to take a photograph pleasantly.

In this connection, there is a demand of further reducing in size and thickness of the mobile device recently. Even on the mobile device, the size and thickness of which are reduced, various electronic parts except for the camera module are mounted. Examples of the above electronic parts are magnetism generating elements such as speakers and so forth. On the other hand, on the camera module described above, a hall element, which is a magnetism detecting element for detecting a position of the movable portion so as to correct the image blur, is arranged.

Therefore, when the camera module is mounted at a position close to the speaker at the time of mounting the camera module on the mobile device, the hall element is affected by a magnetic force generated by the magnetism generating element such as a speaker and malfunction might be caused.

In order to prevent the occurrence of the above problem, for example, it is possible to providing a shielding cover. However, when the above shielding cover is provided, the number of parts is increased and further it is required to provide a space in which the shielding cover is arranged, which becomes an obstacle at the time of reducing a size of the mobile device.

The present invention has been accomplished in view of the above circumstances. An object of the present invention is to provide a mobile device, into the housing of which a camera module having an image stabilization function is incorporated, in which no malfunction is caused in the camera module.

SUMMARY

According to a first aspect of the invention, a first mobile device includes: a camera module; and a magnetism generating part which is different from the camera module. And the camera module includes: a movable portion that corrects camera shake; and a magnetism detecting element that detects a position of the movable portion. When the camera module is in a photographing state, the magnetism generating part is arranged at a position distant from the magnetism detecting element by at least the distance of D mm or more, where $$D = \sqrt{\text{magnetic force of the magnetic generating part [guass]}}.$$

According to the first mobile device, when the camera module is in a photographing state, the magnetism generating part is arranged at a position distant from the magnetism detecting element by at least the D mm or more. Therefore, the affect by a magnetic force to the magnetism detecting element and the occurrence of malfunction of the magnetism detecting element incorporated into the camera module can be suppressed.

The magnetism generating part may be a speaker.

For example, a portable cellular phone, which is an example of a mobile device, has a speaker at the ear piece as the magnetism generating part described above. Therefore, the camera module and the speaker, which is a magnetism generating part different from the camera module, may be arranged so that they can be distant from each other by the distance of D mm or more, where $$D = \sqrt{\text{magnetic force of the magnetic generating part [gauss]}}.$$

According to the experiments made by the applicant, the following was made sure. A magnetic force of the speaker incorporated into the mobile device was approximately 100 gauss. When the camera module was mounted at a position distant from the magnet of the speaker by the distance of $\sqrt{100[\text{gauss}]}=10$ mm or more, the magnetism detecting element in the camera module was not affected. In many cases, a magnetic force emitted by the magnet of the speaker is the strongest in the magnetism generating elements incorporated into the mobile device.

That is, in the case where the magnetic force of the speaker is 100 gauss, when the camera module having a hall element, which is a magnetism detecting element, is arranged being separate from the speaker, which is a magnetism generating element, by a distance not less than 10 mm, a positive operation of the camera module can be guaranteed.

The mobile device may have a liquid crystal display that displaying information which is arranged between the camera module and the speaker.

Since a size of the liquid crystal display is larger than 10 mm in many cases, when the liquid crystal display is interposed between the camera module and the speaker, the distance not less than 10 mm can be necessarily ensured.

The mobile device concerned further includes plural housings. When the mobile device is not used, the plural housings are superimposed each other. And when the mobile device is used, the plural housings aren't superimposed each other. The mobile device furthermore includes a magnet that detects a state in which the plural housings are superimposed and also includes a magnetism sensor that detects magnetism generated by the magnet. The magnetism generating part may be the magnet described above.

In that case, the camera module is mounted at a position distant from the magnet by the distance of 10 mm.

According to a second aspect of the invention, a second mobile device includes plural camera modules. A first camera module in the plural camera modules is a camera module not having a movable portion and a second camera module in the plural camera modules is a camera module having a movable portion that corrects camera shake and also having a magnetism detecting element that detects a position of the movable portion. The mobile device further includes a speaker arranged at a position adjacent to the first camera module. The second camera module is arranged at a position at which the magnetism detecting element attached to the second camera module is distant from the speaker by the distance at least 10 mm or more.

In the second mobile device, no movable portion is provided in the first camera module and the movable portion is provided in the second camera module and the above magnetism detecting element is provided.

Therefore, when the first camera module is arranged adjacent to the above speaker and the second camera module is arranged at a position distant from the speaker by the distance of at least 10 mm or more, both the first and the second camera module can be compactly accommodated in the mobile device.

In this case, it is preferable that the second mobile device includes a liquid crystal display that displays information which is arranged between the second camera module and the speaker.

Then, the liquid crystal display is arranged between the second camera module and the speaker. Therefore, it is sure that the camera module is not affected by a magnetic force generated by the speaker.

The third mobile device of the invention includes a camera module. The camera module includes: a movable portion that corrects camera shake; and a magnetism detecting element that detects a position of the movable portion. The mobile device further comprises: a speaker; and a liquid crystal display that displays information which is arranged between the camera module and the speaker.

According to the third mobile device described above, the liquid crystal display is arranged between the camera module, which has (i) the movable portion that corrects camera shake and (ii) the magnetism detecting element that detects a position of the movable portion, and the speaker. Therefore, it is possible to ensure a distance of not less than 10 mm between the speaker, which is a magnetism generating element, and the camera module having a magnetism detecting element. Accordingly, it is possible to guarantee that the camera module is surely operated.

The mobile device may be a portable cellular phone.

Recently, almost all portable cellular phones have a camera module. A speaker is provided at an ear piece of each portable cellular phone.

When the camera module is mounted on the portable cellular phone so that the liquid crystal display can be arranged between the camera module and the ear piece of the portable cellular phone, it is possible to ensure a distance of not less than 10 mm between the speaker, which is an example of magnetism generating element, and the camera module having a magnetism detecting element, so that the camera module can be surely operated.

As explained above, it is possible to realize a mobile device, into the small housing of which a camera module having an image stabilization function is incorporated, in which no malfunction is caused in the camera module.

BRIEF DESCRIPTION OF THE DRAWINGS

FIG. 2 is a block diagram showing an inner structure of the portable cellular phone 100.

FIG. 6A, FIG. 6B and FIG. 6C are views showing a portable cellular phone 300, the constitution of which is of the sliding type.

FIG. 10A, FIG. 10B and FIG. 10C are schematic illustrations for explaining operation of the camera module.

DETAILED DESCRIPTION

Referring to the accompanying drawings, an embodiment of the present invention will be explained below.

Figure 1A:
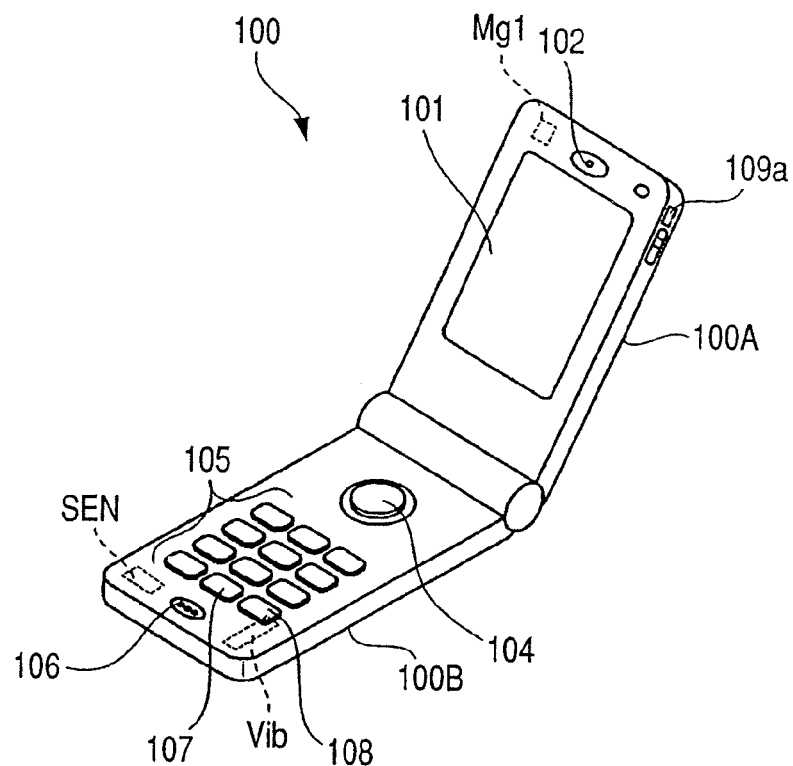
FIG. 1A and FIG. 1B are perspective views showing the appearance of a portable cellular phone to which an embodiment of the invention is applied.
Figure 1B:
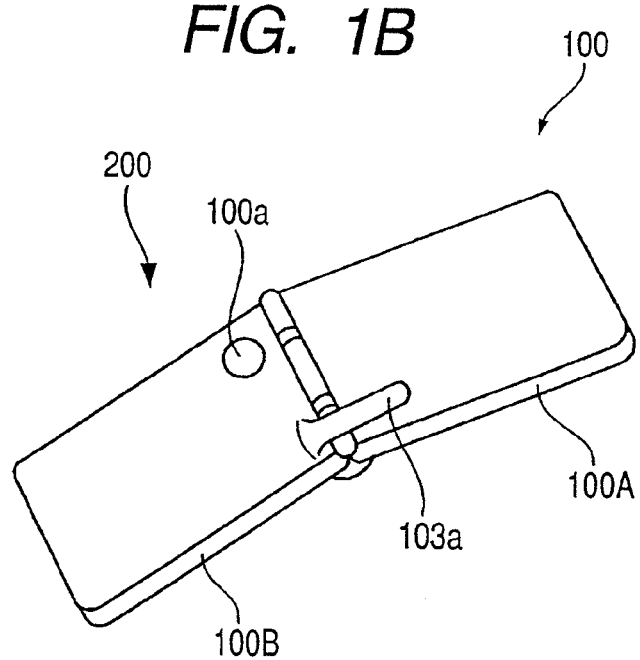

FIG. 1A and FIG. 1B are perspective views showing the appearance of a portable cellular phone to which an embodiment of the present invention is applied.

FIG. 1A is a view showing a front face of the portable cellular phone 100. The front face of the portable cellular phone 100 includes: a liquid crystal panel 101 on which a menu screen and an image to be photographed are displayed; an ear piece 102 in which a speaker (shown in FIG. 2) is arranged and voices are emitted from the speaker into space; a selection button 104 used when various functions are selected and also used as a shutter button at the time of photographing; push buttons 105 for inputting telephone numbers; a mouth piece 106 in which a microphone (shown in FIG. 3) is arranged and voices are transmitted to the microphone through the mouth piece 106; a decision button 107 for deciding telephone numbers inputted by a user; a power source button 108; and a second antenna 109a for sending and receiving images and address information by wireless communication without using a central telephone exchange. The above speaker 102, the vibrator Vib used for the manner mode and the magnet Mg1, which is used for detecting a state of folding when the upper side housing 100A and the lower side housing 100B are folded on each other, are provided as the magnetism generating elements of the present invention. As can be seen in FIG. 1A and FIG. 1B, the portable cellular phone of the present embodiment is of the folding type. Therefore, when the upper side housing 100A is folded (superimposed) onto the lower side housing 100B, the magnet Mg1 of the upper side housing 100A gives a magnetic force to the magnetic sensor SEN provided in the lower housing 100B. Therefore, the magnetic sensor SEN detects that the upper and the lower side housing are folded (superimposed) on each other.

FIG. 1B is a rear view of the portable cellular phone 100. On the rear face of the portable cellular phone 100, the first antenna 103a (which is an example of a magnetism generating element) for sending and receiving data such as a voice and a mail through a central telephone exchange and the taking lens 100a are arranged. This taking lens 100a is held by an image stabilization unit described later.

That is, the portable cellular phone 100 shown in FIG. 1A and FIG. 1B is an example of the mobile device of the invention. The portable cellular phone includes: an ear piece 102 having a speaker of the present invention; a camera module 200; and a liquid crystal display 101 for displaying information which is arranged between camera module 200 and the ear piece 102.

FIG. 2 is a block diagram showing an inner structure of the portable cellular phone 100.

The portable cellular phone 100 includes: a camera module 200; an A/D (Analog/Digital) conversion portion 113; a microphone 106; a speaker 102; an interface unit 120; a first antenna 103a; a first transmit-receive unit 103; an input controller 130; an image signal processing unit 140; a video encoder 150; an image display device 160; a second antenna 109a; a second transmit-receive unit 109; a memory 170; CPU 180; a media controller 190; a vibrator Vib; a magnetic sensor SEN; and various switches 181 such as a selection button 104 and push buttons 105 shown in FIG. 1A. Further, the media controller 190 is connected to the recording media 190a. In the embodiment, the camera module 200, the gyrosensor 182 and two drivers DR1, DR2 for driving a holding module (described later) provided in the camera module 200 compose an example of the camera module of the present invention.

CPU 180 transmits a command of processing to each unit of the portable cellular phone 100 shown in FIG. 2 so that each unit can be controlled. For example, when the selection button 104 shown in FIG. 1A is pressed down under the condition that the photographing mode is set, CPU 180 gives a command to CCD 112 provided in the camera module 200. At the same time, CPU 180 gives a command to DR1, DR2 so that the holding module (described later) provided in the camera module 200 can be swung in a direction so that camera shake detected by the gyrosensor 182 can be erased. In this way, while camera shake is being corrected, photographing is executed. The constitution of the camera module 200 will be explained in detail later.

When the selection button 104 shown in FIG. 1A is pressed down, CPU 180 sets an electronic shutter in CCD 112 provided in the camera module 200 and photographing is started.

At this time, a direction of camera shake, which is caused when the selection button 104 is pressed down, is detected by the gyrosensor 182 and informed to CPU 180. After the result of the detection of the gyrosensor 182 has been informed to CPU 180, CPU 180 informs the drivers DR1, DR2 of the correcting direction, so that the drivers DR1, DR2 can drive a coil (described later) provided in the image stabilization unit. In this way, while the holding module (described later) in the camera module 200 is being oscillated in accordance with the blur, photographing is executed. In this way, camera shake caused when the selection button 104 is pressed is corrected and an image of the photographic object can be formed on CCD 112 without causing blur on the image.

CCD 112 receives the light from the object, which has passed through the taking lens 100a, while the electronic shutter is being operated and an image of the object, which has been formed by the light from the object, is read out as an object signal which is an analog signal. The object signal generated by CCD 112 is converted into digital photographic image data by A/D converter 113. The thus converted photographic image data is sent to the image signal processing unit 140 through the input controller 130.

In the image signal processing unit 140, the image data is subjected to image processing such as an RGB level adjustment and a gamma adjustment. Further, the image data after the image processing is compressed. After the compression, the image data is once sent to the memory 170.

The memory 170 includes: SDRAM, the high recording speed, (i) in which a program executed in this portable cellular phone 100 is stored and (ii) which is used as an intermediate buffer; SRAM, which is a memory for storing data, in which data for various menu screens and a setting content to be set by a user are stored; and VRAM in which the compressed image data is stored. VRAM is divided into plural regions and image data are stored in the plural regions in order. The stored image data are read out to the video encoder 150 and the media controller 190 in order.

According to the instruction given by CPU 180, the video encoder 150 obtains the compressed image data from the memory 170. The video encoder 150 converts the compressed image data into data capable of being displayed on the liquid crystal panel 101. The converted image data is sent to the image display unit 160 and an image represented by the image data is displayed on the liquid crystal panel 101 by the image display unit 160. The media controller 190 records the compressed image data, which is stored in the memory 170, in the recording media 190a and reads out the image data recorded in the recording media 190a.

When a telephone number is inputted by using the push buttons 105 shown in FIG. 1A and then the decision button 107 is pressed down, the telephone number of which has been set and the communication with an opponent is started. At this time, the communication information including the telephone number of the portable cellular phone 100 and the inputted telephone number is transmitted from CPU 180 to the first transmit-receive unit 103 and converted into electric waves and transmitted to the antenna 103a. Then, electric waves are emitted from the antenna 103a. The electric waves emitted from the first antenna 103a are transmitted to a central telephone exchange through a party line antenna (not shown in the drawing) arranged everywhere, for example, at a building or a telephone pole. In the central telephone exchange, a telephone connection with the opponent device, to which the designated telephone number is allotted, is established.

When the connection with the opponent device is established, a voice emitted by a user to the portable cellular phone 100 is collected by the microphone 106 and the thus collected voice is converted into electric waves expressing voice data by the interface unit 120 and transmitted to the opponent device by the first antenna 103a of the first transmit-receive unit 103. Electric waves of voices received through the first antenna 103a are converted into voice data by the interface unit 120 and emitted from the speaker 102 as voices. In the first transmit-receive unit 103 and the first antenna 103a, not only the voice data but also the mail data representing a mail by using a mail address is transmitted and received. Mail data, which has been received by the first antenna 103a and digitized by the first transmit-receive unit 103, is stored in the memory 170 by the input controller 130.

This portable cellular phone 100 includes a wireless communication interface (a second transmit-receive unit 109, a second antenna 109a) for executing wireless communication to make a short-distance communication without using a central telephone exchange which is different from a communication interface (a first transmit-receive unit 103, a first antenna 103a) for executing communication with the other portable cellular phone through the central telephone exchange. Examples of the communication interface to make a short-distance wireless communication are infrared ray communication and bluetooth. In the present embodiment, infrared ray communication is applied to the communication interface. When infrared rays directly sent from another other portable cellular phone are received by the second antenna 109a, an electric signal according to the received infrared rays is picked up by the second transmit-receive unit 109 and converted into digital data. On the contrary, when data is sent to an external device, the data is transmitted to the second transmit-receive unit 109 and converted into electric waves in the second transmit-receive unit 109 and emitted from the second antenna 109a.

When infrared rays representing an image are received by the second antenna 109a, an electric signal according to the infrared rays is converted into image data in the second transmit-receive unit 109. In the same manner as that of the photographic image data, the converted image data is sent to the image display unit 160 and an image represented by the image data is displayed on the liquid crystal panel 101 and recorded in the recording media 190a through the media controller 190.

When the manner mode is set by operating the selection button 104, information representing an arrival of a telephone call which has been sent through the first transmit-receive unit 103 is received by CPU 180 and the vibrator Vib is vibrated. Duef to the foregoing, the user can know that the portable cellular phone is in a state of a telephone call arrival. When the upper side housing and the lower side housing shown in FIG. 1A are folded on each other, a magnetic force of Mg1 is detected by the magnetic sensor SEN, so that it is possible to detect that the upper side housing and the lower side housing have been folded on each other.

The portable cellular phone 100 is essentially composed as described above.

Next, the constitution of the camera module 200 provided in the portable cellular phone 100 will be explained in detail below.

Figure 3:
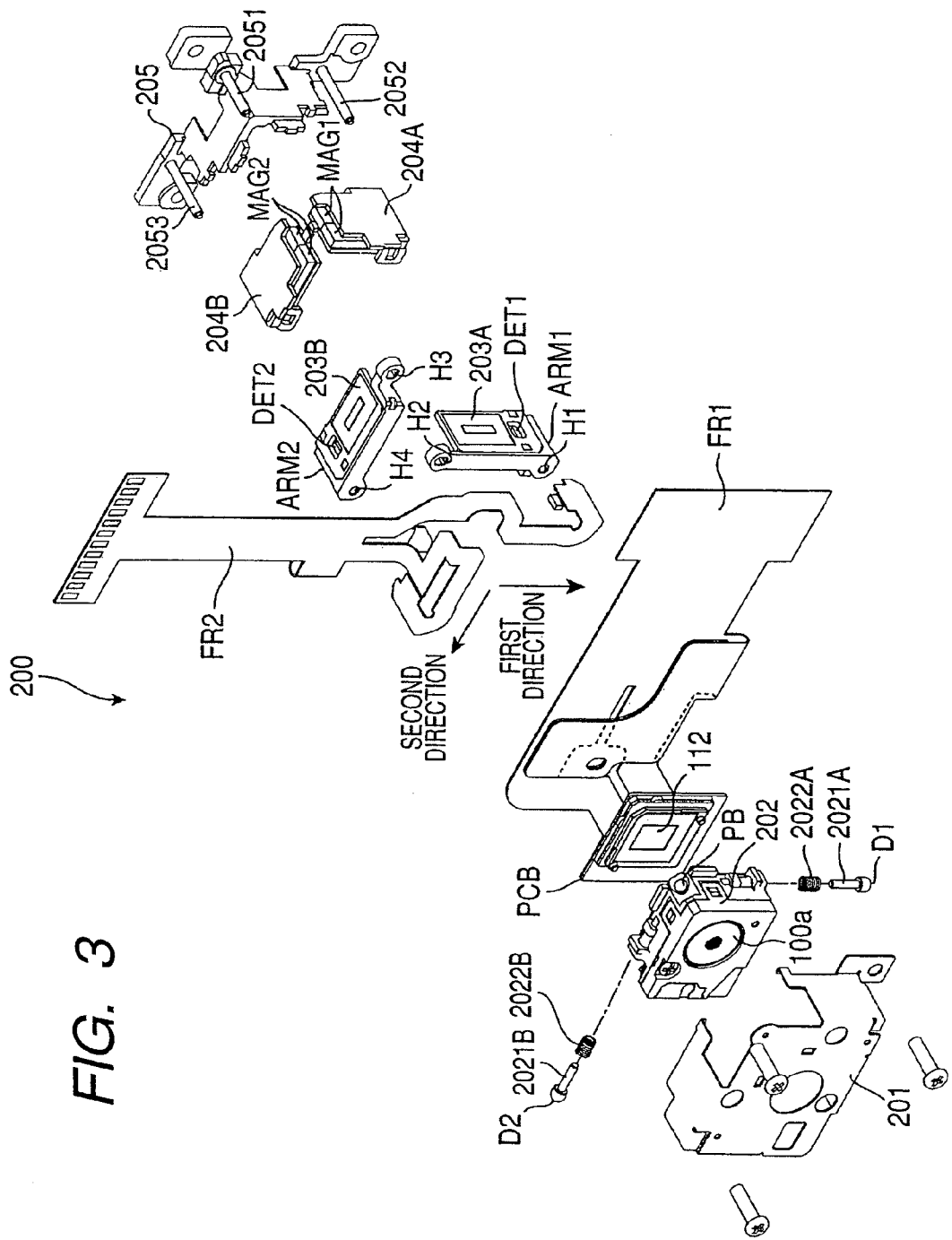
FIG. 3 is an exploded perspective view showing a camera module 200.
Figure 4:
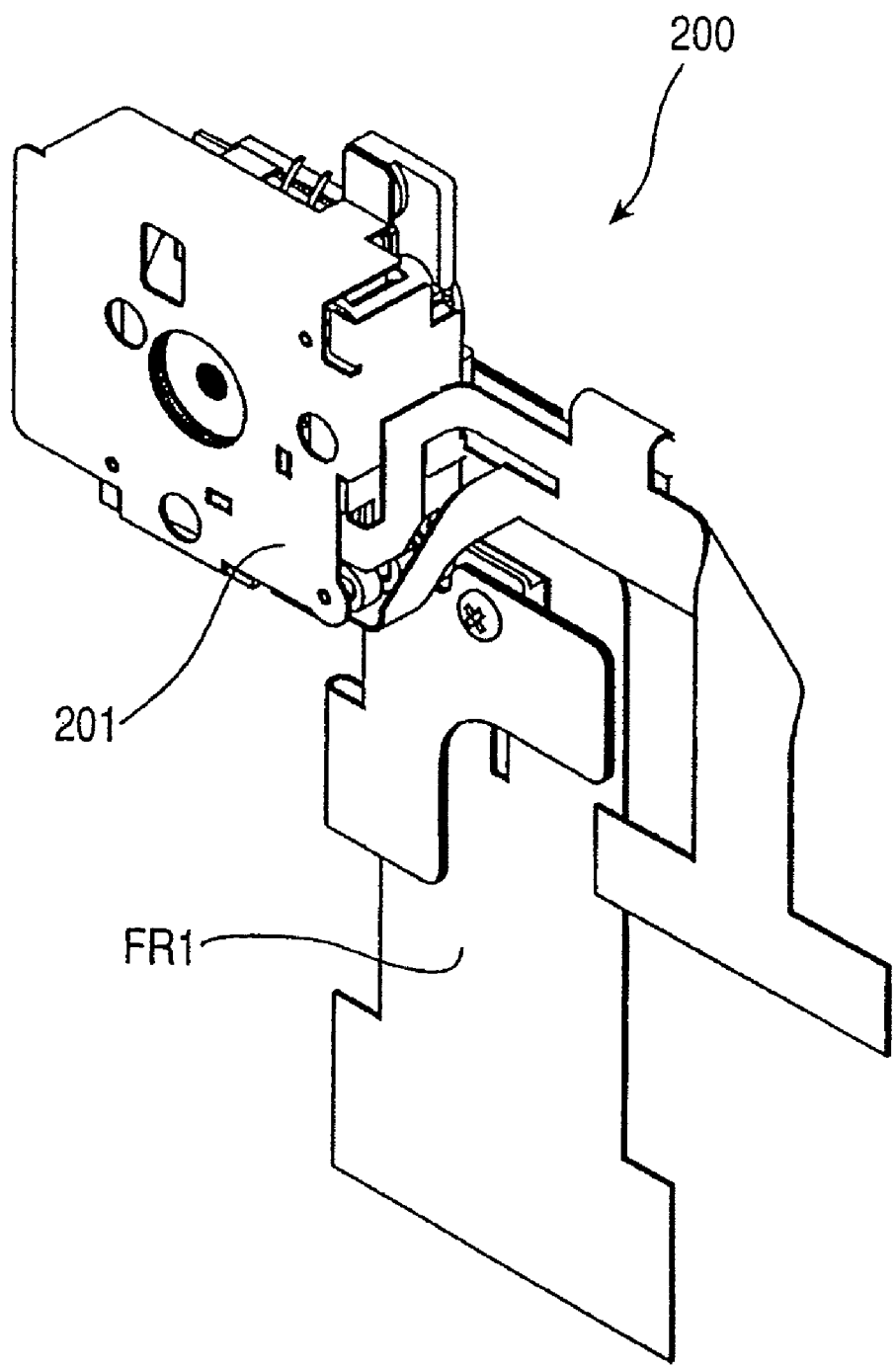
FIG. 4 is a view showing the camera module 200 into which the members shown in the exploded perspective view of FIG. 3 are incorporated.
Figure 5:
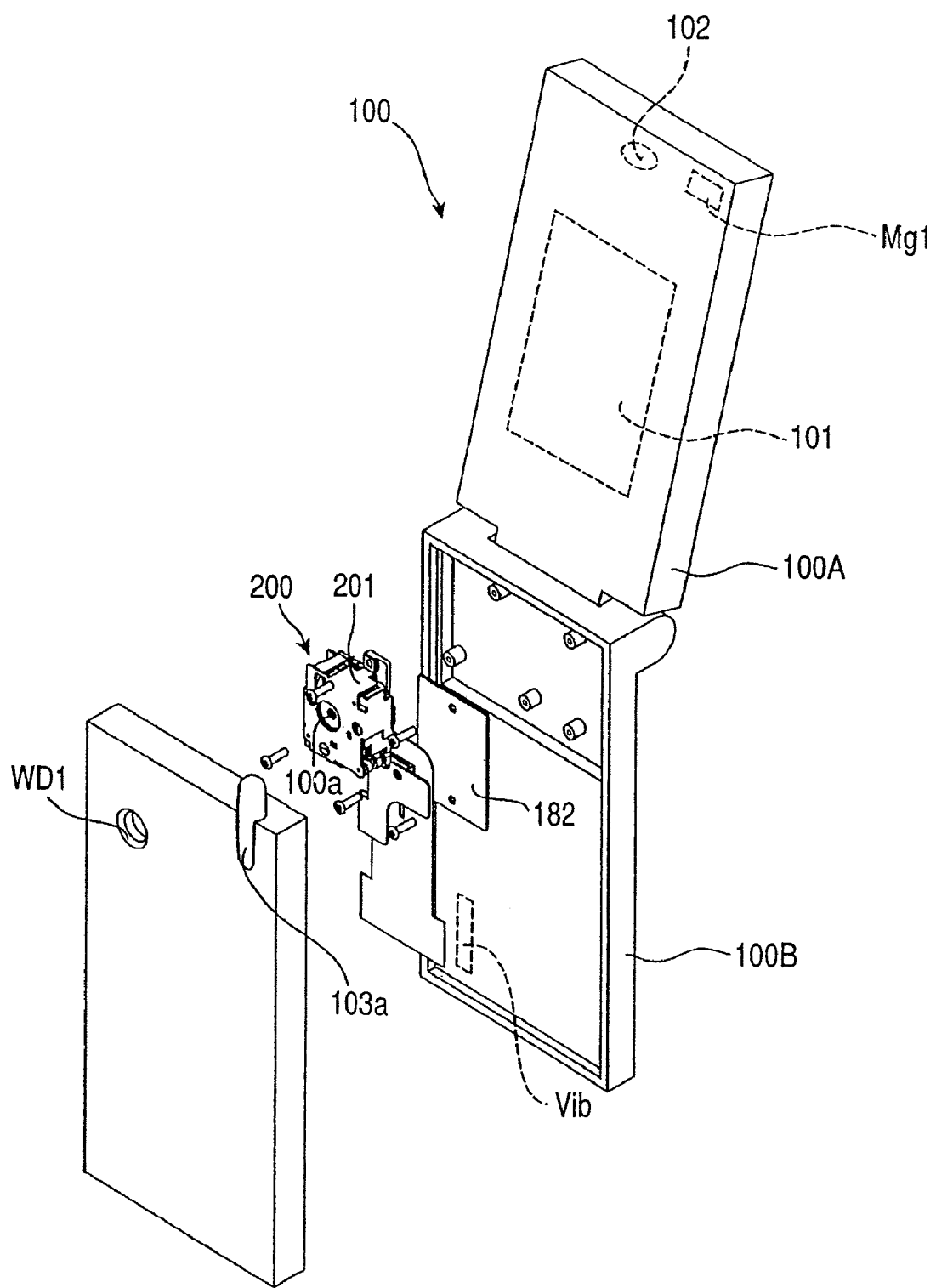
FIG. 5 is a schematic illustration for explaining a state in which the camera module 200 is incorporated into the portable cellular phone 100.

FIG. 3 is an exploded perspective view showing a camera module 200. FIG. 4 is a view showing the camera module 200 into which the members shown in the exploded perspective view of FIG. 3 are incorporated. FIG. 5 is a schematic illustration for explaining a state in which the camera module 200 is incorporated into the portable cellular phone 100.

In FIGS. 3 and 4, the left lower side is the object side.

From the object side which is on the left lower side of FIG. 3, there are shown a cover 201, a holding module 202, a flexible board FR1 for transmitting an image signal, a flexible board FR2 for energizing each coil formed on both the board 203A extending in the first direction of FIG. 3 and the board 203B extending in the second direction in FIG. 3, a pair of arms ARM1, ARM2 for respectively holding the boards 203A, 203B on which the coil is formed, U-shaped yokes 204A and 204B for holding the magnets MAG1, MAG2, the N-poles and the S-poles of which are arranged so that they can be opposed to the coils formed on the boards 203A, 203B, and a supporting member 205 for movably supporting two arms and for fixing the two yokes 204A and 204B so that they can be respectively fixed onto faces extending in the first and the second direction. FIG. 3 shows these parts in the exploded state in order. These parts are assembled to each other as shown in FIG. 4.

First, referring to FIG. 3, the constitution will be explained as follows.

On the most right side of FIG. 3, the dogleg supporting member 205 for supporting two drive mechanisms to swing the holding module 202 is shown. Two drive mechanisms for swinging the holding module is supported by this supporting member 205. At the same time, the holding module is supported by this supporting member 205 being capable of freely swinging.

This supporting member 205 has three guide members 2051, 2052, 2053 which are respectively inserted into the hole portions H1, H2, H3, H4 provided at both end portions of two arms ARM1, ARM2. These guide members 2051 to 2053 are respectively arranged at the top portions of the supporting member 205 having a dogleg. The central guide member 2051 is inserted into both the holes H1 and H3 formed at both end portions of the arms ARM1, ARM2.

That is, one ARM1 of the two arms is inserted into the guide member 2051 which is located at the central top of the dogleg supporting member 205 and also inserted into the guide member 2052 which is located at the end portion side top of the dogleg supporting member 205. The other arm ARM2 is inserted into the guide member 2051 which is located at the central top of the dogleg supporting member 205 and also inserted into the guide member 2053 which is located at the top of the other end portion side. In this connection, although not shown in the drawing, on the holding module side of one end portion side (where the holes H2, H4 are located) of the arms ARM1, ARM2, a recess portion engaging with a spherical protrusion on the holding module side is provided. On the holding module side of the central portion of the dogleg supporting member 205, a supporting portion for supporting the holding module 202 is provided. In this supporting portion, a recess portion is provided.

U-shaped yokes 204A, 204B are fixed being made to adhere onto the faces extending in the first and the second direction of FIG. 3 from the central top of the dogleg supporting member 205. These U-shaped yokes 204A, 204B are arranged so that openings can be directed to the sides on which the boards 203A, 203B having a coil are existing. Therefore, the boards 203A, 203B are arranged so that they can be respectively accommodated from the opening side being parallel with the magnets MAG1, MAG2. The boards 203A, 203B are connected to the flexible board FR2 so that the coils on the boards can be energized. On the boards 203A, 203B on which the coils are formed, the hall elements DET1, DET2 for detecting a position of the holding module 202 swinging according to the movements of the arms ARM1, ARM2 are provided. In this connection, as described in the Patent Application No. 2007-035341 filed by Fujinon Corporation, the hall elements DET1, DET2 are respectively moved together with the boards 203A, 203B on which the coil is formed and when the holding module 202 is driven by the arms ARM1, ARM2, a change of a magnetic force given from each magnet MAG1, MAG2 is detected by the hall elements DET1, DET2. When the arms ARM1, ARM2 are moved in the optical axis direction along the guide members 2051 to 2053, a change in the magnetic force of each magnet MAG1, MAG2 spreading horizontally with respect to the optical axis direction is detected.

As described before, on the holding module 202 side of the central top portion of the dogleg supporting member 205, a recess portion is formed which is a supporting portion for supporting the holding module 202 when it is engaged with the spherical protrusion of the holding module 202. Therefore, when the recess portion is engaged with the protrusion PB of the holding module 202 and the spherical recess portions respectively provided in two arms ARM1, ARM2 movably supported by the supporting portion 205 are engaged with the protrusion of the first drive point D1 of the holding module 202 and the protrusion of the second drive point D2 of the holding module 202, as shown in FIG. 4, the holding module 202 can be supported by the supporting member 205 being freely swung.

In this connection, in FIG. 3, in order to show the first drive point D1 and the second drive point D2, the rod-shaped members 2021A, 2021B having a spherical protrusion and the springs 2022A, 2022B respectively inserted into the rod-shaped members 2021A, 2021B are shown. The respective arms 2022A, 2022B are members having a function of fixing the two arms ARM1, ARM2 when the coil is not energized. Each spring 2022A, 2022B has the following function. When the coil is not energized, the protrusion (the first protrusion D1, the second protrusion D2) is pressed to the recess portion on the arm side by a spring force. Due to the foregoing, when the energizing of the coil is turned off, the arm is made to come to a standstill at the position.

In this example, not only the lens but also CCD 112 is held by the holding module 202. Therefore, the flexible board FR1 for transmitting an image signal is connected to the swinging holding module 202. One end portion of the flexible board FR1 is connected to the sensor board PCB on which CCD 112 is mounted. A portion at least first extending from the sensor board PCB is connected being extended in an oblique direction to (i) the first direction of connecting the pivot point PB with the first drive point D1 and (ii) the second direction of connecting the pivot point PB with the second drive point D2 toward the outside from the holding module 202. Due to the foregoing, the swinging is seldom transmitted to the flexible board.

The above explanations of the image stabilization unit 200 is substantially the same as those of the constitution proposed in the Japanese Patent Application No. 2007-035341. The entire contents of the Japanese Patent Application No. 2007-035341 are incorporated herein by reference.

In the present embodiment, the camera module having the constitution of the Patent Application No. 2007-035341 is skillfully incorporated into a small space in the portable cellular phone as shown in FIG. 5 in which the camera module can not be affected by a magnetic force generated by the magnetism generating element (the speaker of the ear piece 102, the magnet Mg1 and the vibrator Vib). The constitution of the present embodiment will be explained below.

In the portable cellular phone of the present embodiment, the ear piece (speaker) 102, which is an example of the magnetism generating element, is provided in an upper portion of the housing 100A on the upper side. The antenna 103a, which is an example of the magnetism generating element, is provided in a right upper portion of the housing 100B on the lower side. Further, the vibrator Vib, which is an example of the magnetism generating element, is provided in a right lower portion of the housing 100B on the lower side. Furthermore, the magnet Mg1, which is an example of the magnetism generating element, is provided in a left upper portion of the housing 100A on the upper side.

When consideration is given to the above arrangements, it can be said that only when the camera module 200 can be mounted at a left upper position the housing 100B on the lower side shown in FIG. 5, it is possible for the camera module to evade being given an influence from either magnetism generating element. As described before, a magnetic force of the magnet provided in the speaker arranged at the ear piece 102 of the portable cellular phone is approximately 100 gauss. The present applicant made experiments and confirmed the following. When the camera module is separated from the magnetism generating element by a distance not less than 10 mm in the magnetic field of approximate 100 gauss, the camera module is not affected by the magnetic force.

Therefore, the camera module 200 is skillfully arranged at a position (shown in FIG. 1A and FIG. 1B) where the selecting switch 104 is provided between the camera module 200 and the antenna 103*a*, the push buttons 105 are provided at a position (shown in FIG. 1A and FIG. 1B) between the camera module 200 and the vibrator Vib and the liquid crystal panel 101 is provided between the camera module 200 and the ear piece 102. Since a size of any part is not less than 10 mm, the camera module 200 can be arranged at a position distant from the magnetism generating element by a distance not less than 10 mm. Accordingly, an influence of the magnetism given to the hall element, which is the magnetism detecting element provided in the camera module 200, can be suitably avoided. As a result, it is possible to guarantee an accurate action of the camera module 200.

As explained above, it is possible to realize a portable cellular phone in which a camera module having an image stabilization function is incorporated into a small housing and there is no possibility of malfunction of the camera module. In this connection, the magnetic field intensity H is expressed by the following expression, $$H = \frac{1}{4\mu\mu_0} \frac{m}{r^2}$$

where m denotes the magnetic charge, r denotes the distance and μ denotes the magnetic permeability.

Accordingly, since the magnetic field is in inverse proportion to the square of a distance, in the case of the magnetic field of 100 gauss, the camera module may be arranged at a position distant from the magnetism generating element by the distance of $(100)^{1/2}=10$ mm or more. In the case of the magnetic field of 200 gauss, the camera module may be arranged at a position distant from the magnetism generating element by the distance of $(200)^{1/2}=14.14$ mm or more.

In the first embodiment, explanations are made into the constitution of the folding type portable cellular phone. However, some portable cellular phones are of the type in which the upper side housing and the lower side housing are slid on each other. Therefore, an example of the sliding type portable cellular phone, which is the second embodiment, will be explained as follows.

FIG. 6A, FIG. 6B and FIG. 6C are views showing a portable cellular phone 300, the constitution of which is of the sliding type.

FIG. 6A is a view showing a state in which the upper side housing 300A and the lower side housing 300B are superimposed on each other. FIG. 6B is a view showing a state in which the upper side housing 300A is slid on the lower side housing 300B and opened from the state shown in FIG. 6A. FIG. 6C is a side view of FIG. 6B.

Even in the sliding type shown in FIG. 6A, FIG. 6B and FIG. 6C, when the camera module 200 is arranged at the same position as that of the first embodiment, it is possible to positively operate the camera module 200.

Figure 7A:
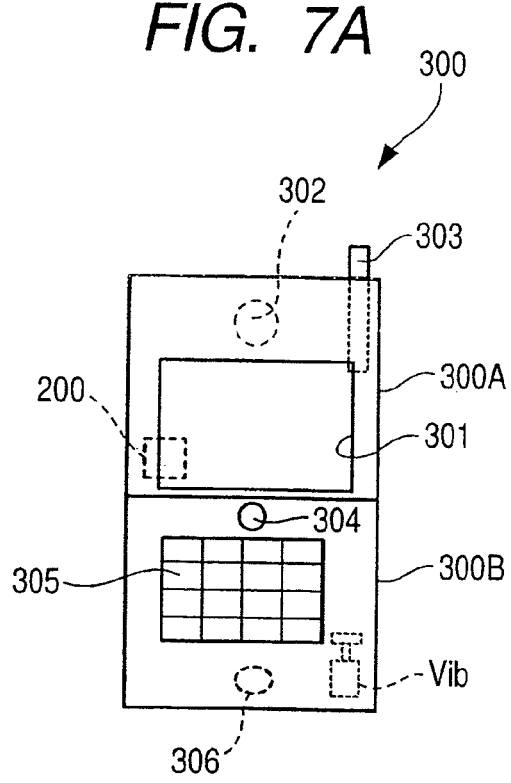
FIG. 7A and FIG. 7B are views showing an example in which the camera module 200 is arranged at a left lower position of the liquid crystal display 301 of the upper side housing 300A.
Figure 7B:
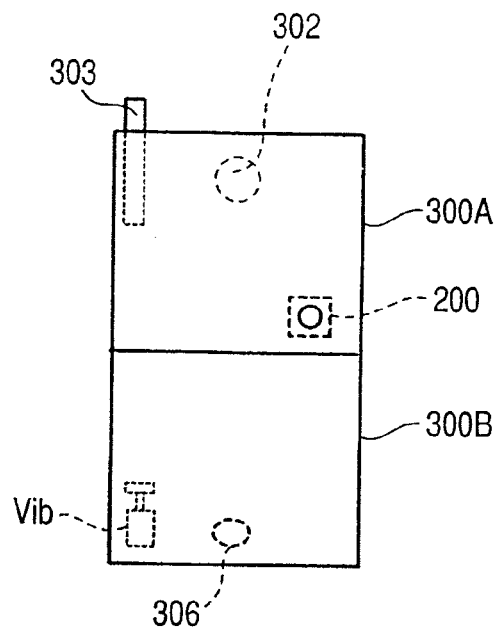
Figure 8:
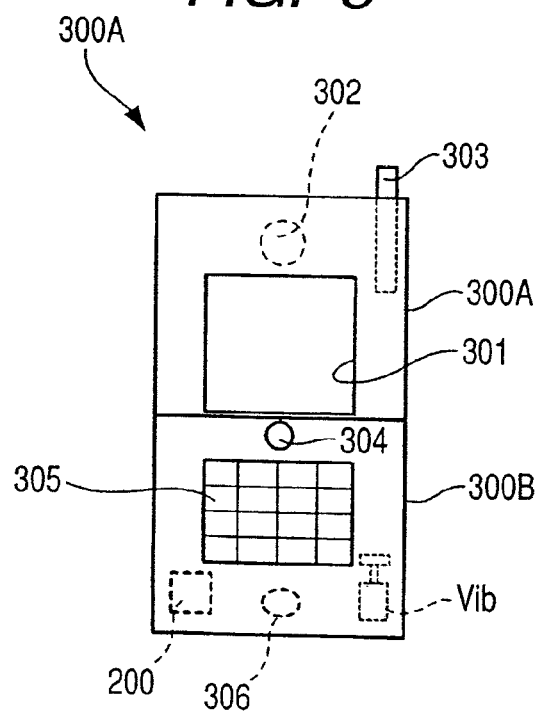
FIG. 8 is a view showing an example in which the camera module 200 is arranged at a left lower position of the push buttons 305.

FIG. 7A, FIG. 7B and FIG. 8 are views respectively showing the third and the fourth embodiment, the constitution of which will be explained below.

FIG. 7A and FIG. 7B are views showing an example in which the camera module 200 is arranged at a left lower position of the liquid crystal display 301 of the upper side housing 300A. FIG. 8 is a view showing an example in which the camera module 200 is arranged at a left lower position of the push buttons 305 of the lower side housing 300B.

In the third embodiment shown in FIG. 7A and FIG. 7B, even when the camera module 200 is arranged on the left lower side of the liquid crystal display of the upper side housing 300A, as shown in FIG. 7B, it is possible to arrange the camera module 200 at a position distant from the antenna 303, the vibrator Vib and the ear piece 302 by the distance not less than 10 mm. Therefore, this constitution can be accepted.

An electric condenser microphone is usually used for the microphone 306. Therefore, the microphone is not a magnetism generating element. Therefore, it is possible to arrange the camera module 200 at a position adjacent to the microphone 306 as shown in FIG. 8. Although it becomes a little difficult to hold the portable cellular phone at the time of photographing, even when the camera module 200 is arranged at the position shown in FIG. 8, it is possible to guarantee a positive operation of the camera module.

Finally, there is provided a portable cellular phone having two cameras, wherein one is a camera for photographing the user himself for the use of visual telephone and the other is a camera for usual photographing. This example will be explained as follows.

Figure 9A:
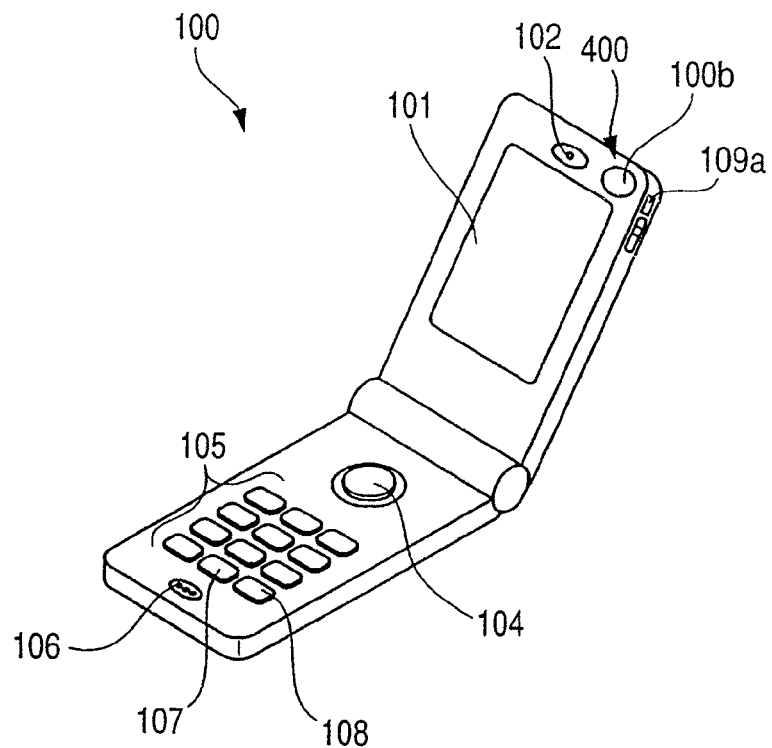
FIG. 9A and FIG. 9B are schematic illustrations for explaining the constitution of a portable cellular phone having two camera modules 200, 400.
Figure 9B:
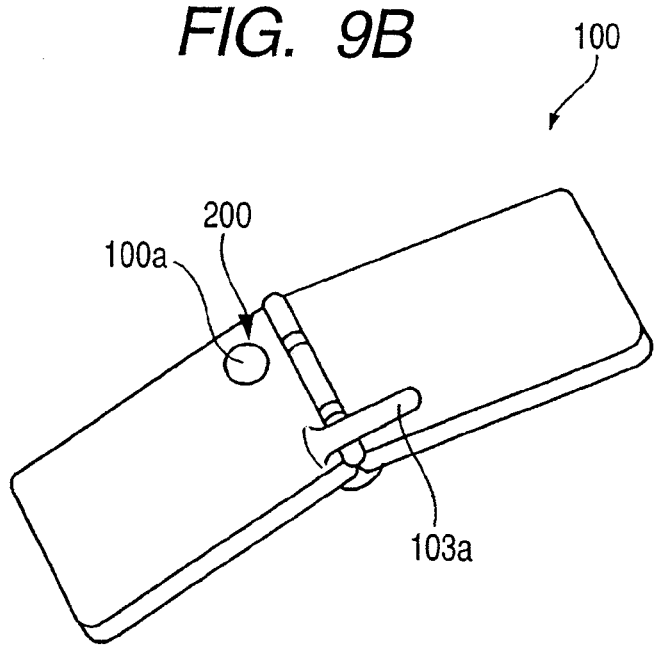

FIG. 9A and FIG. 9B are schematic illustrations for explaining the constitution of a portable cellular phone having two camera modules 200, 400.

FIG. 9A and FIG. 9B shows a taking lens 100*b* provided in the first camera module 400 and a taking lens 100*a* provided in the second camera module 200.

The first camera module 400 for photographing the user himself shown in FIG. 9A and FIG. 9B has no movable portion and the second camera module 200 for usual photographing has a movable portion. The second camera module 200 has the same constitution as that shown in FIG. 3.

In this case, the first camera module 400 is arranged at a position close to the earpiece (speaker) 102 and the second camera module 200 is arranged at a position distant from the speaker 102 by at least 10 mm or more, that is, in this case, the second camera module 200 is arranged at a position so that the liquid crystal panel 101 can be interposed between the speaker 102 and the second camera module 200.

In the case where two camera modules are provided, when each part is arranged as shown in FIG. 9A and FIG. 9B, even when the housing is small, it is possible to compactly accommodate the two camera modules.

In this connection, in the embodiment described above, two camera modules are arranged. However, three or more camera modules may be arranged. In the case where three or more camera modules are arranged, the speakers can be arranged on another side or close to the microphone.

Explanations are made into the camera module in which camera shake is corrected by swinging the holding module in which the taking lens and the image sensor element are integrated with each other into one body. However, the present invention is not limited to this type camera module. As long as it is of the type in which the movable portion is detected by the magnetism detecting element, the camera module may be of the type in which camera shake is corrected by relatively moving the taking lens and CCD.

What is claimed is:
1. A mobile device comprising:
a camera module that is on a rear side of a housing;
a speaker; and
a liquid crystal display that displays information;
wherein the camera module includes:
a movable portion that corrects camera shake; and a magnetism detecting element that detects a position of the movable portion, wherein the liquid crystal display is arranged between the camera module and the speaker, and wherein the camera module and speaker are separated by at least a distance corresponding to a size of the liquid crystal display so as to prevent the magnetism detecting element from being affected by a magnetic force generated from the speaker.

2. The mobile device according to claim 1, wherein the housing includes an upper side housing, a lower side housing, and a hinge coupled to the upper and lower side housings therebetween, wherein the speaker and the liquid crystal display are mounted in the upper side housing, and wherein the camera module is mounted in the lower side housing.

3. The mobile device according to claim 1, wherein the liquid crystal display and push buttons are arranged between the speaker and the camera module.

4. The mobile device according to claim 2, wherein the liquid crystal display and push buttons are arranged between the speaker and the camera module.

5. The mobile device according to claim 1, wherein the camera module is arranged at a position adjacent to a microphone.

6. A mobile device according to claim 2, wherein the camera module is arranged at a position adjacent to a microphone.

* * * * *